United States Patent
Zhang et al.

(10) Patent No.: US 7,076,459 B2
(45) Date of Patent: Jul. 11, 2006

(54) DEMAND ESTIMATION USING AUCTION PRICE ANALYSIS

(75) Inventors: Alex Xin Zhang, Mountain View, CA (US); Dirk Beyer, Mountain View, CA (US); Julie Ann Ward, Menlo Park, CA (US); Tongwei Liu, Redwood City, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 880 days.

(21) Appl. No.: 09/813,907

(22) Filed: Mar. 21, 2001

(65) Prior Publication Data

US 2002/0161622 A1 Oct. 31, 2002

(51) Int. Cl.
*G06Q 40/00* (2006.01)
(52) U.S. Cl. ............................................. 705/37; 705/35
(58) Field of Classification Search ................. 705/53, 705/37, 35
See application file for complete search history.

(56) References Cited

U.S. PATENT DOCUMENTS

| | | | | |
|---|---|---|---|---|
| 6,151,589 | A * | 11/2000 | Aggarwal et al. | 705/36 R |
| 6,263,327 | B1 * | 7/2001 | Aggarwal et al. | 706/47 |
| 6,728,689 | B1 * | 4/2004 | Drissi et al. | 706/14 |
| 2001/0039497 | A1 * | 11/2001 | Hubbard | 705/1 |
| 2002/0038363 | A1 * | 3/2002 | MacLean | 709/224 |

* cited by examiner

*Primary Examiner*—Alain L. Bashore

(57) ABSTRACT

A method for generating a demand estimate for a product includes gathering a set of auction data which is relevant to the product, removing from the auction data all but a highest bid from each unique bidder in the auction data, and correcting a bias in the auction data caused by a set of characteristics of an auction from which the auction data is obtained. In one embodiment, the auction data is obtained from an on-line auction which is characterized by bidders not necessarily knowing the start time of the auction.

20 Claims, 4 Drawing Sheets

DEMAND ESTIMATION USING AUCTION PRICE ANALYSIS

BACKGROUND OF THE INVENTION

1. Field of Invention

The present invention pertains to the field of demand estimation. More particularly, this invention relates to demand estimation using auction price analysis.

2. Art Background

It is often desirable in a marketing/sales or other application to determine the likely purchasing behavior of consumers in response to product pricing. Such a determination may be useful, for example, in setting product prices to achieve a desired sales target and/or in generating sales forecasts in response to product price changes.

One prior method for determining the likely purchasing behavior of consumers is to perform statistical regression analysis on point-of-sales data. Unfortunately, such a method usually requires complete data on sales activities and customer characteristics. As a consequence, such a method is usually complex and costly and often yields only limited success.

Other prior methods for determining the likely purchasing behavior of consumers include conducting consumer surveys by questionnaires and/or interviews and running product sales for limited times and/or at limited locations to gather relevant data. Unfortunately, such methods are usually relatively time-consuming and costly. In addition, such methods may be subject to errors caused by uncontrolled factors such as weather conditions which may impact consumer shopping behavior as well as efforts by competitors to meet or beat a sales price.

SUMMARY OF THE INVENTION

A method is disclosed for generating a demand estimate for a product. A method according to the present teachings includes gathering a set of auction data which is relevant to the product, removing from the auction data all but a highest bid from each unique bidder in the auction data, and correcting a bias in the auction data caused by a set of characteristics of an auction from which the auction data is obtained. In one embodiment, the auction data is obtained from an on-line auction which is characterized by bidders not necessarily knowing the start time of the auction.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
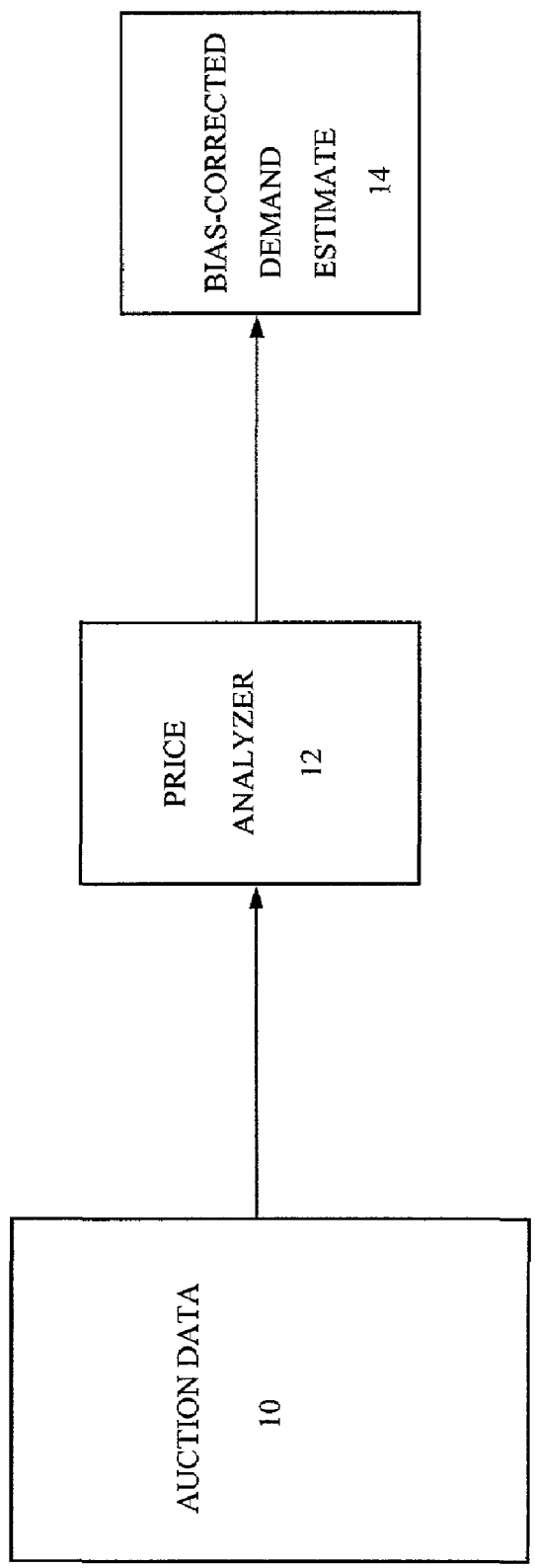
FIG. 1 shows a price analyzer according to the present teachings.

FIG. 1 shows a price analyzer 12 according to the present teachings. The price analyzer 12 generates a bias-corrected demand estimate 14 for a product in response to a set of auction data 10 associated with the product.

The auction data 10 includes a set of bids obtained during an auction for the product. The bids recorded in the auction data 10 may be biased in comparison to a traditional auction due to the characteristics of the auction that yields the auction data 10. For example, the bids logged in the auction data 10 may be biased because the bidders in the auction did not necessarily know the start time for the auction whereas in a traditional auction the bidders are usually present for the entire duration of the auction. In one embodiment, the auction from which the auction data 10 is derived is an on-line auction such as one conducted via the Internet.

The product associated with the auction data 10 may be any product or any service or any combination of product/service.

The price analyzer 12 generates the bias-corrected demand estimate 14 by performing a statistical analysis to the auction data 10 to correct for the bias. The bias-corrected demand estimate 14 provides an estimate of the percentages of consumers that are likely to purchase the product at a set of possible prices for the product. The bias-corrected demand estimate 14 may be represented as a graph and/or table and may be represented in web formats such as HTML, XML, etc.

The price analyzer 12 may be implemented in hardware, software or a combination of hardware/software.

Figure 2:
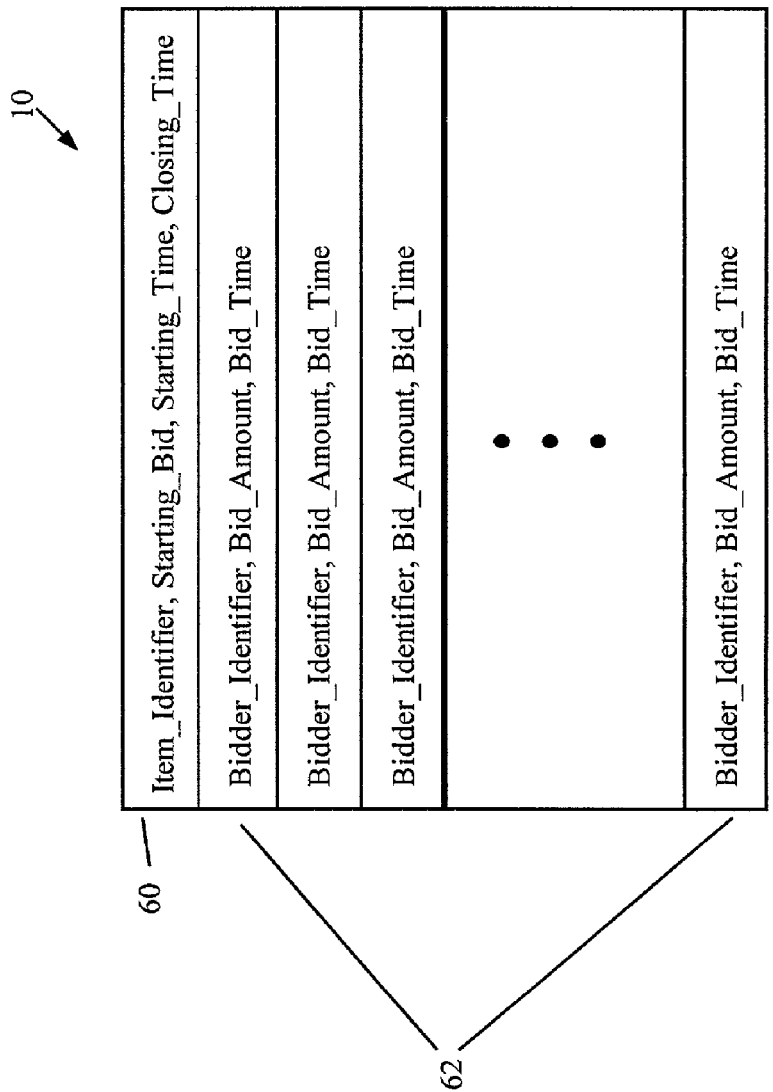
FIG. 2 illustrates a set of auction data in one embodiment.

FIG. 2 illustrates the auction data 10 in one embodiment. The auction data 10 includes an entry 62 that provides information associated with a product under auction including an Item_Identifier, a Starting_Bid, a Starting_Time, and a Closing_Time. The Item_Identifier uniquely identifies the product under auction. The Starting_Bid is the starting bid for the product under auction, the Starting_Time and Closing_Time are the day, month, year, hour, and second for the start and close of the auction, respectively.

The auction data 10 includes a set of bid entries 62 each of which provides information associated with a bid entered for the product during the auction. Each bid entry 62 includes a Bidder_Identifier that uniquely identifies the corresponding bidder in a manner that enables the detection of multiple bids by the same bidder. Each bid entry 62 includes a Bid_Amount and a Bid_Time that specifies the day, month, year, hour, and second that the corresponding bid was made.

In some embodiments, the auction data 10 may be gathered manually. In other embodiments, the auction data 10 may be gathered in an automated manner. For example, a computer program may be used to gather the auction data 10 from web sites that host on-line auctions. Example web sites include e-bay.com, yahoo.com and amazon.com to name a few examples. Auction web sites commonly provide auction data to buyers and sellers that participate in an auction in order to enable participants to determine the correct and fair workings of the auction. The auction data on a web site may take the form of bid logs or a bid history.

Figure 3:
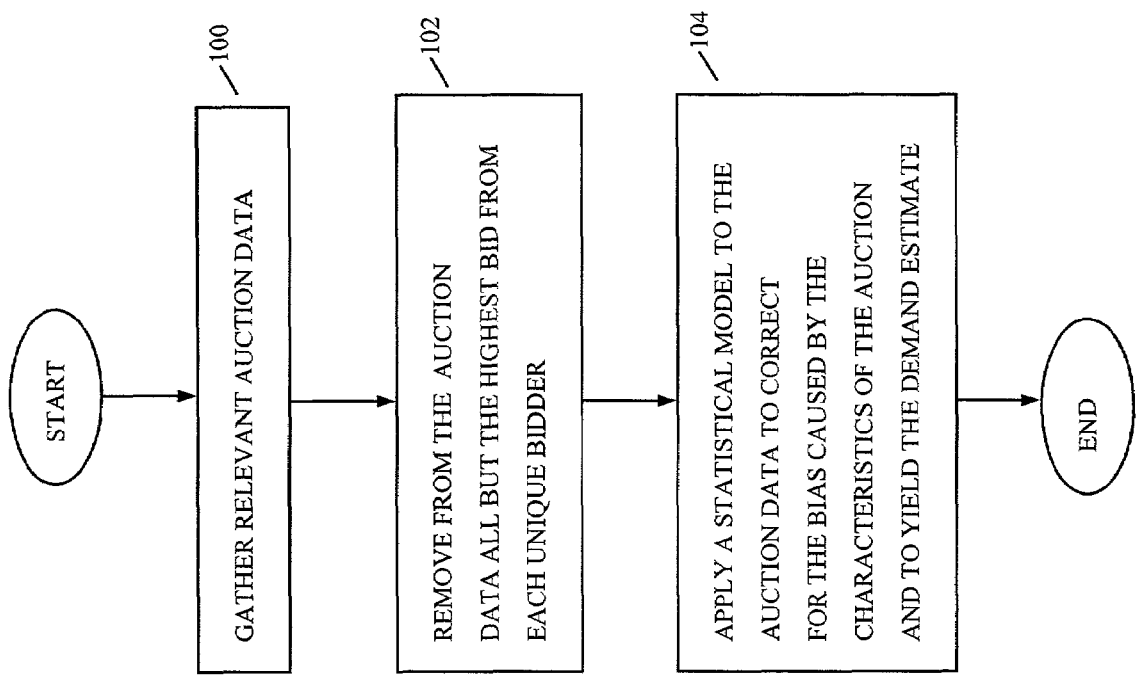
FIG. 3 shows a method for generating a bias-corrected demand estimate according to the present techniques.

FIG. 3 shows a method for generating the bias-corrected demand estimate 14 according to the present techniques. At step 100, a set of relevant auction data is gathered. Step 100 may include a sub-step of searching through on-line auction web sites for auctions for a relevant product. For example, if it is desired to obtain a demand estimate for a particular model of personal computer then web sites may be searched for auctions of that particular model or similar model using the Item_Ientifiers or similar information from the on-line auctions. The auction data for the relevant product is then gathered from the web site and may be downloaded and stored locally as the auction data 10 for further processing.

At step 102, the auction data 10 is pre-processed to remove all but the highest bid for each unique bidder. For example, if multiple bid entries 62 of the auction data 10 specify the same Bidder_Identifier then from those entries the one with the highest Bid_Amount is retained and the rest are discarded from the auction data 10.

At step 104, a statistical model is applied to the auction data 10 to correct the biases caused by the characteristics of the auction from which the auction data 10 was obtained. Step 104 yields the bias-corrected demand estimate 14 (x(p)) which is a bias-corrected estimate of bidding at price level p. x(p) represents the fraction of all consumers who are willing to pay a price=p for the relevant product as follows:

$$x(p) = \prod_{i=1}^{p-1}(1-f_i)$$

where $f_i$ is the relative frequency count of the number of bidders who bid price i as recorded in the auction data 10.

The function x(p) may be used to generate the demand estimate 14 in a graph and/or tabular form including HTTP and XML forms.

Figure 4:
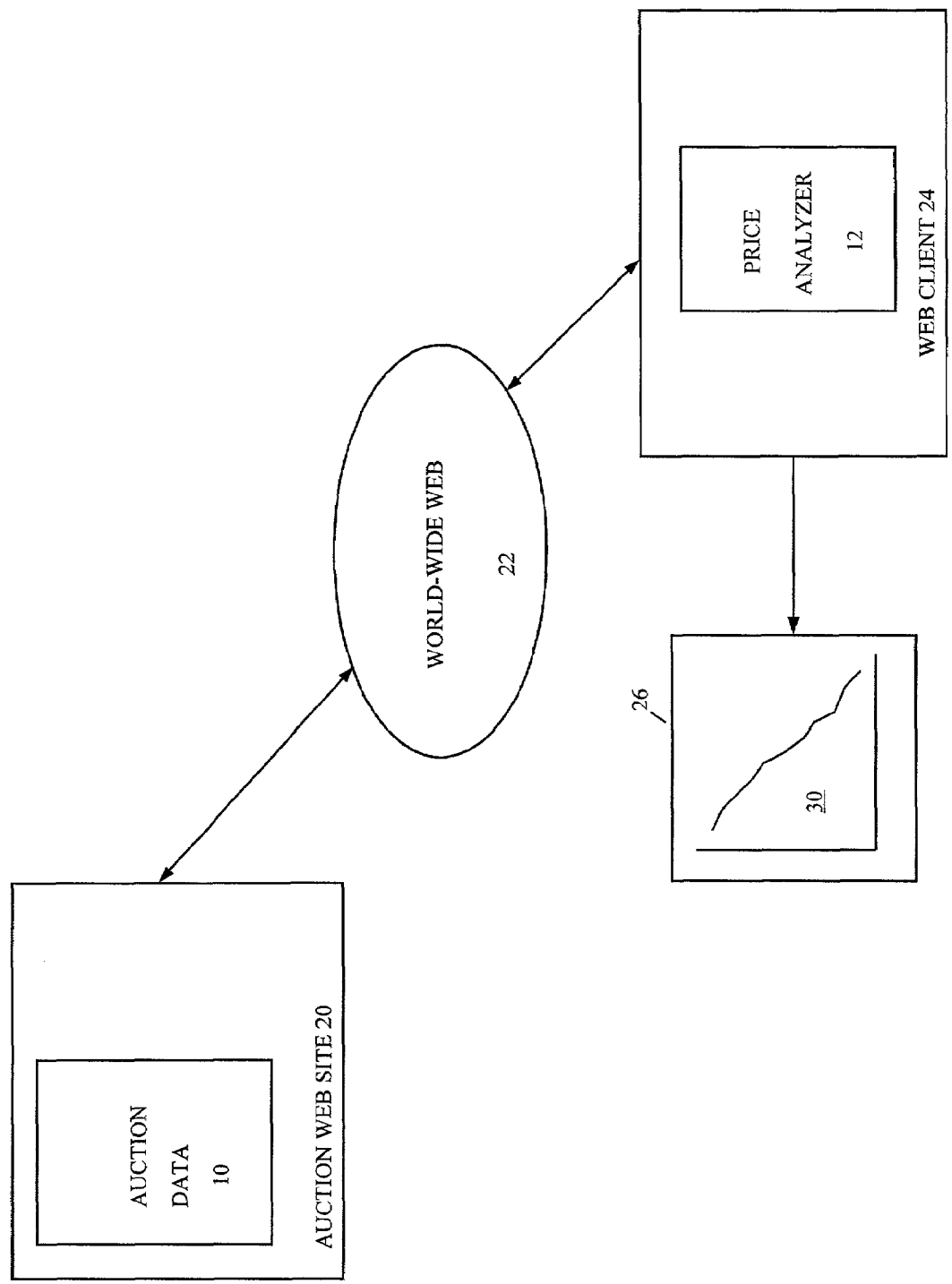
FIG. 4 shows an arrangement which includes an auction price analyzer according to the present teachings.

FIG. 4 shows a system which includes the price analyzer 12 according to the present teachings. In this system, the auction data 10 is contained on auction web site 20 which is accessible via the world-wide web 22. The prices analyzer 12 in this embodiment is implemented in software on a web client 24. The web client 24 implements the appropriate hardware/software, protocols, etc., for web communication. The price analyzer 12 searches for and finds the auction data 10 using the Item_Identifier in the auction data 10 and then downloads the auction data 10 into the web client 24 via the world-wide web 22 using web communication protocols.

The price analyzer 12 generates the bias-corrected demand estimate 14 and renders it in a graph 30 on a display 26. The bias-corrected demand estimate 14 may be obtained by or transferred to other communication elements connected to the world-wide web 22.

The present techniques provide relatively low-cost and fast analysis in comparison to conventional methods. These techniques are non-intrusive to human subjects and enables near real-time detection of shifts in demands and prices. These techniques provide an independent source of demand and pricing information which may be used to cross-check other available information.

In some embodiments, the price analyzer 12 may be implemented in an on-line auction web site as a service to buyers and sellers who participate in auctions on the web site. Auction originators and bidders may benefit from the demand function provided by the price analyzer 12 in forming realistic price expectations and setting starting bids and reserve prices and bidding strategies.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A computer-based method for generating a demand estimate for a product, comprising:
   removing from a set of auction data all but a highest bid from each unique bidder in the auction data;
   determining the demand estimate by correcting a bias in the auction data caused by a set of characteristics of an auction from which the auction data is obtained using a computer-based mechanism such that the demand estimate provides an estimate of a likelihood that a consumer will purchase the product.

2. The method of claim 1, further comprising gathering the auction data.

3. The method of claim 2, wherein gathering the auction data includes searching an auction web site for the product.

4. The method of claim 2, wherein gathering the auction data includes obtaining the auction data from an auction web site.

5. The method of claim 1, wherein correcting the bias includes applying a statistical model to the auction data.

6. The method of claim 1, further comprising generating a graph of the demand estimate.

7. The method of claim 1, further comprising generating a table containing the demand estimate.

8. A system for generating a demand estimate for a product, comprising:
   a set of auction data including a set of bids for the product;
   price analyzer that determines an estimate of a likelihood that a consumer will purchase the product by removing from the auction data all but a highest bid from each unique bidder in the auction data and correcting a bias in the auction data caused by a set of characteristics of an auction from which the auction data is obtained.

9. The system of claim 8, further comprising means for gathering the auction data.

10. The system of claim 9, wherein the means for gathering the auction data includes means for searching an auction web site for the product.

11. The system of claim 9, wherein the means for gathering the auction data includes means for obtaining the auction data from an auction web site.

12. The system of claim 8, wherein the price analyzer corrects the bias by applying a statistical model to the auction data to obtain the demand estimate.

13. The system of claim 8, wherein the price analyzer generates a graph of the demand estimate.

14. The system of claim 8, wherein the price analyzer generates a table containing the demand estimate.

15. A method for generating a demand estimate for a product, comprising:
   gathering a set of auction data that pertains to the product from an auction web site using a web client;
   removing from the auction data all but a highest bid from each unique bidder in the auction data;
   determining an estimate of a likelihood that a consumer will purchase the product by correcting a bias in the auction data caused by a set of characteristics of an auction corresponding to the auction data.

16. The method of claim 15, wherein determining an estimate comprises determining an estimate of a likelihood that a consumer will purchase the product at a set of possible prices for the product.

17. The method of claim 15, wherein gathering a set of auction data includes searching the auction web site for a product that is similar to the product.

18. The method of claim 15, wherein correcting a bias includes applying a statistical model to the auction data.

19. The method of claim 15, further comprising generating a graph of the demand estimate.

20. The method of claim 15, further comprising generating a table containing the demand estimate.

* * * * *

UNITED STATES PATENT AND TRADEMARK OFFICE
CERTIFICATE OF CORRECTION

PATENT NO. : 7,076,459 B2 Page 1 of 1
APPLICATION NO. : 09/813907
DATED : July 11, 2006
INVENTOR(S) : Alex Xin Zhang et al.

It is certified that error appears in the above-identified patent and that said Letters Patent is hereby corrected as shown below:

On the Title page, in field (73), in "Assignee", in column 1, line 2, delete "LP." and insert -- L.P. --, therefor.

Signed and Sealed this

Nineteenth Day of May, 2009

JOHN DOLL
*Acting Director of the United States Patent and Trademark Office*